H. C. DeWITT.
AUTOMATIC HOSE-REEL.

No. 190,014. Patented April 24, 1877.

WITNESSES:
J. C. Wilcke
Will N. Dodge.

INVENTOR:
Henry C. DeWitt.
by Dodge & Son.
Attys.

UNITED STATES PATENT OFFICE.

HENRY C. DE WITT, OF CHICAGO, ILLINOIS.

IMPROVEMENT IN AUTOMATIC HOSE-REELS.

Specification forming part of Letters Patent No. 190,014, dated April 24, 1877; application filed April 11, 1877.

*To all whom it may concern:*

Be it known that I, HENRY C. DE WITT, of Chicago, in the county of Cook and State of Illinois, have invented certain Improvements in Automatic Hose-Reel, of which the following is a specification:

This invention consists of a hose-reel having a hose attached to the hollow shaft thereof, with a device arranged to open a valve or stop-cock in a stand-pipe by the turning of the reel, whereby the hose is filled with water automatically by the mere act of unwinding it from from the reel, all as hereinafter more fully described.

Figure 1:
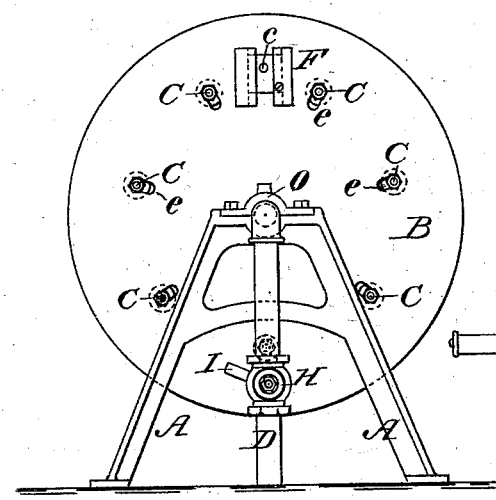
Figure 2:
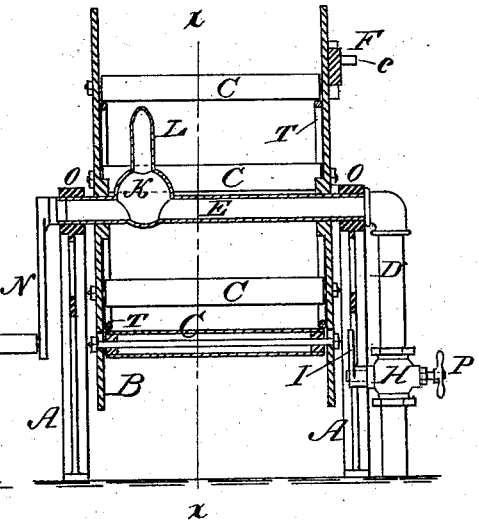

Figure 1 is an end elevation of the apparatus. Fig. 2 is a vertical section taken lengthwise of the reel, and Fig. 3 is a vertical section on the line $x$ $x$ of Fig. 2.

It is now quite common to have in buildings a stand-pipe connected with the water-pipes of the city or town, and to have a hose to be attached thereto in case of fire. In such cases it is of the utmost importance that the water be applied at the earliest possible moment, in order to quench the fire before it attains much headway, and to accomplish this result I construct my apparatus as follows:

I provide a reel, which is preferably composed of two heads or disks connected by a hollow journal, E, and a series of rods, C, upon which the hose is wound in the usual manner. In the drawings I have represented these rods C as having their ends resting on springs T, and in slots in the head B, to allow them to yield as the hose is filled; but this forms no part of my invention and is not necessary, except when large collapsible hose is used, which seldom occurs in buildings, the smaller rubber hose being generally used for this purpose.

Figure 3:
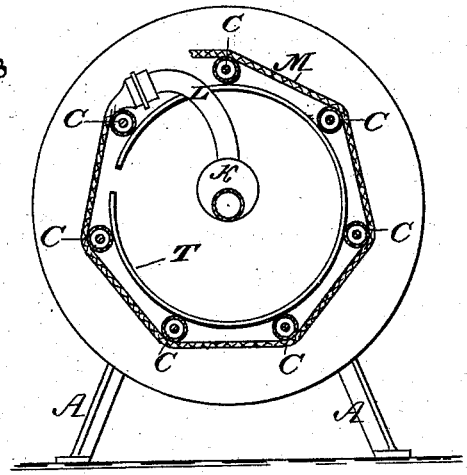

The reel thus made has a bent tube, L, Figs. 2 and 3, attached to its hollow journal E, with or without the interposed chamber K, and to the end of this tube L the hose M is secured, as shown in Fig. 3, the hose being wound upon the reel in the usual manner. The reel is mounted in a frame or supports, A, which may be secured to the floor, as represented in this case, or be attached to the side wall or the ceiling overhead, according to circumstances, the reel, of course, turning freely in its bearings or boxes O. D represents the stand-pipe, which may be arranged in any desired position, but, preferably, standing at right angles and near to the end of the reel, as represented in Figs. 1 and 2. This pipe D is connected to the hollow shaft E of the reel by a loose joint, made water-tight, so that, while the reel is free to revolve, the water can enter from the pipe D through the hollow shaft E and pipe L to the hose, which may thus be filled, or be kept filled while 'wound upon the reel. In the pipe D is arranged a stop-cock, H, to the inner end of which is rigidly attached an arm, I, standing at right angles, as shown in Fig. 2. To the outer face of the disk or head of the reel, on the end next to the stand-pipe D, is secured a slide, F, as shown in Figs. 1 and 2, which has a projecting stud or arm, $c$, of such a length that, as the reel is rotated, this stud $c$ will strike the arm I of the stop-cock H, thereby turning the latter and letting the water from the pipe D enter the hose, the latter being provided with a nozzle, which also has a stop-cock.

The object of arranging the stud $c$, which turns the cock H, so it can be slid nearer to, or farther from, the center of the reel, is that it can be moved so that it will not strike arm I when it is desired to wind up the hose.

By this construction and arrangement of parts, it will be seen that all that is necessary in case of a fire is for the attendant to sieze the end of the hose and run to the spot where the fire is, for the first turn of the reel will cause the stud $c$ to turn the cock H and let on the water, so that by the time the hose is unwound, or before, it will be filled, and thus the water can be applied to the fire the instant the attendant arrives within reach of it. It will be necessary for the attendant to open the nozzle-cock slightly the moment he commences to unwind the hose, in order to permit the escape of the air in case a stiff round hose be used.

The apparatus is exceedingly simple and not at all liable to get out of order, and this is of great importance, as these appliances are usually left to the care and management of servants.

I am aware that a reel having a hollow journal, with the hose attached, has before been used, and also that a reel has before been provided with appliances for opening a cock by the turning of the reel, and therefore I do not claim these broadly; but Having described my invention, what I claim is—

The reel having its hollow shaft E connected to the supply-pipe D, and provided with the adjustable or sliding stud $c$, in combination with the stop-cock H, provided with the arm I, all constructed and arranged to operate substantially as described.

HENRY C. DE WITT.

Witnesses:
W. C. DODGE,
DONN I. TWITCHELL.